United States Patent [19]

Ferencz et al.

[11] Patent Number: 6,093,270
[45] Date of Patent: Jul. 25, 2000

[54] BONDING PROCESS

[75] Inventors: Andreas Ferencz; Norbert Huebner; Herbert Fischer, all of Duesseldorf; Lothar Unger, Haan; Bernd Peters, Solingen; Wolf-Ruediger Mueller, Hilden; Horst Donothek, Monheim; Joerg Kuhn, Moenchengladbach, all of Germany

[73] Assignee: Henkel Kommanditgesellscahft auf Aktien, Duesseldorf, Germany

[21] Appl. No.: 08/952,917

[22] PCT Filed: May 22, 1996

[86] PCT No.: PCT/EP96/02194

§ 371 Date: Nov. 24, 1997

§ 102(e) Date: Nov. 24, 1997

[87] PCT Pub. No.: WO96/37566

PCT Pub. Date: Nov. 28, 1996

[30] Foreign Application Priority Data

May 26, 1995 [DE] Germany ............................ 195 19 391
Dec. 27, 1995 [DE] Germany ............................ 195 48 842

[51] Int. Cl.$^7$ ..................................................... B29C 65/06
[52] U.S. Cl. .......................... 156/73.5; 156/327; 523/511; 523/513
[58] Field of Search ..................................... 156/73.5, 325, 156/326, 327, 330; 264/68; 523/500, 511, 513

[56] References Cited

U.S. PATENT DOCUMENTS

| | | | |
|---|---|---|---|
| 3,539,481 | 11/1970 | Parker ........................................ | 260/27 |
| 4,131,714 | 12/1978 | Karkoski et al. ......................... | 428/379 |
| 5,115,073 | 5/1992 | Meckel et al. .............................. | 528/83 |
| 5,223,672 | 6/1993 | Pinneo et al. ...................... | 156/73.5 X |
| 5,371,131 | 12/1994 | Gierenz et al. ........................... | 524/394 |
| 5,593,120 | 1/1997 | Hamerski et al. ................. | 156/73.5 X |
| 5,705,003 | 1/1998 | Farrow et al. .......................... | 156/73.5 |

FOREIGN PATENT DOCUMENTS

| | | |
|---|---|---|
| 0 405 329 | 1/1991 | European Pat. Off. . |
| 0 421 154 | 4/1991 | European Pat. Off. . |
| 20 22 464 | 2/1972 | Germany . |
| 995 524 | 6/1965 | United Kingdom . |
| 2 135 684 | 9/1984 | United Kingdom . |
| WO84/02144 | 6/1984 | WIPO . |
| WO94/13726 | 6/1994 | WIPO . |

OTHER PUBLICATIONS

Encyclopedia of Polymer Science and Technology, vol. 11, Interscience Publishers div. of John Wiley & Sons (editors: H. Marh & N. Gaylord) "Polyester" p 62–128.

Encyclopedia of Polymer Science and Technology, vol. 13, Wiley–Interscience Publication: John Wiley & Sons, "Polyurethane" p 244–48.

*Primary Examiner*—James Sells
*Attorney, Agent, or Firm*—Wayne C. Jaeschke; Stephen D. Harper; Daniel S. Ortiz

[57] ABSTRACT

The proposed process for bonding together two substrates with an anhydrous or low-water-content partially crystalline adhesive which is solid at room temperature is characterized in that the adhesive is first activated by internal and/or external friction. The substrates are then joined together with the adhesive between them. When allowed to stand, the structure attains its final strength after a period of between a few seconds to a few days. The friction destroys the crystalline structure and causes the adhesive to become gluey, and re-crystallization gives it its final strength and eliminates the gluey quality. The adhesive is based preferably on polyester or polyurethane and used preferably in the form of a gum stick without impermeable packaging. It is especially suitable for bonding paper, since it does not cause corrugation.

42 Claims, No Drawings

BONDING PROCESS

This invention relates to a process for bonding substrates using a water-free or low-water, partly crystalline adhesive which is solid at room temperature, to the adhesive and to its production.

BACKGROUND OF THE INVENTION

Processes for bonding substrates with adhesives solid at room temperature are known, thus, the hotmelt adhesives solid at room temperature are first heated until they become tacky and are then applied in the form of a melt to the substrates to be bonded. After the substrates have been fitted together, the hotmelt adhesives set physically and solidify on cooling through crystallization or an increase in viscosity. Raw materials for such hotmelt adhesives are, for example, polyethylene vinyl acetate, polyamide, polyester and polyurethane. One such PU hotmelt adhesive is described in WO 94/13726. This document claims a water-soluble, high molecular weight nonionic partly crystalline polyurethane as the basis for a hotmelt adhesive. The polyurethane is characterized by the following structural units:

a) $-O(-CH_2-CH_2-O)_n-$,
   where n=8 to 500 and, more particularly, 20 to 300,
b) $-CO-NH-X-NH-CO-$,
   where X is an aliphatic or cycloaliphatic residue, more particularly a residue of m-tetramethyl xylene diisocyanate (TMXDI), and
c) $-O-Y-O-$,
   where Y is a hydrophobic residue, more particularly either
   $(-CH_2-CH(CH_3)-O)_m-CH_2-CH(CH_3)-$,
   $(-CH_2-CH(C_2H_5)-O)_m-CH_2-CH(C_2H_5)-$ and
   $(-CH_2-CH_2-CH_2-CH_2-O)_m-CH_2-CH_2-CH_2-CH_2-$
   where m=8 to 500 and, more particularly, 20 to 300, or an alkylene or cycloalkylene group containing 2 to 44 carbon atoms and, more particularly, 6 to 36 carbon atoms,
c) making up 0 to 40% by weight, more particularly 2 to 30% by weight and preferably 5 to 25% by weight, based on a)+c) in the polyurethane.

Hotmelt adhesives have the general disadvantage that a heat source is required for melting.

Adhesives solid at room temperature which are suitable for bonding without melting, for example adhesive sticks, are also known. In order to bond substrates with an adhesive stick, the adhesive stick is simply drawn over the substrate to be bonded and the substrate thus coated with adhesive is fitted together with the other substrate. The adhesive which is tacky at room temperature sets by evaporation of the solvent or the water or by diffusion of the solvent or the water into the substrate.

One such adhesive stick is described in EP 405 329. The dimensionally stable, soft-rubbing adhesive stick consists of an aqueous formulation of a polyurethane as binder, a soap gel as the shaping gel-forming component and, if desired, auxiliaries. The polyurethane is a reaction product of a polyol or polyol mixture, an isocyanate component with a functionality of 2 or more, a component capable of salt formation in alkaline aqueous solution and/or a nonionic hydrophilic modifier and, if desired, a chain-extending agent. In Example 1d, a polyurethane was prepared from 29.7 parts by weight of isophorone diisocyanate, 100 parts by weight of polyethylene propylene glycol with an EO content of 10% and a molecular weight of 2,000, 6.8 parts by weight of dimethylol propionic acid and 2.2 parts by weight of NaOH. In the acetone process, an aqueous dispersion with a solids content of 36% by weight was prepared. Finally, the adhesive was produced from 82 parts by weight of this PU dispersion and 2 parts by weight of water, 7 parts by weight of glycerol, 3 parts by weight of PPG 600, 3 parts by weight of sodium palmitate and 3 parts by weight of sodium stearate. The adhesive had a melt viscosity of 2.4 Pas at 60° C. An adhesive stick of the type in question has the disadvantage that it requires a sealed pack, otherwise it would be in danger of drying out and its properties would be adversely affected. In addition, paper curls under the effect of the high water content of the adhesive.

These disadvantages are avoided in an adhesive stick which consists of a solid adhesive component and a microencapsulated solvent (cf. GB 995,524). Unfortunately, this adhesive stick has the disadvantage that, after use, a skin forms over its surface and has to be laboriously removed before the adhesive stick can be used again.

The disadvantages of a water-based adhesive stick are also avoided by the adhesive stick based on wax, polypropylene and rosin according to DE 20 22 464. The stick is activated by frictional heat, the uppermost adhesive layer melting. On cooling, the stick sets almost instantaneously so that correction is no longer possible. In addition, the handling of this known stick is complicated by stringing. Finally, the presence of rosin has to be indicated on the label.

Against the background of this prior art, the problem addressed by the present invention was to provide a bonding process and an adhesive suitable therefor which would not have any of these disadvantages and would be easy to handle. This would include in particular little or no packaging, application under light pressure, a composition that would not have to be shown on a label and simple elimination of the bond as when required. The adhesive would be particularly suitable for paper and paperboard.

DETAILED DESCRIPTION OF THE INVENTION

The solution provided by the invention is defined in the claims and consists in particular in a process for bonding substrates with an adhesive solid at room temperature which is characterized in that the adhesive is activated by internal and/or external friction, the substrates are fitted together with the now tacky adhesive in between and the adhesive is allowed to set by leaving for a few seconds to a few days.

To generate internal friction, volume elements of the adhesive are moved relative to one another, for example by working between the fingers. The adhesive becomes tacky and may be used like an adhesive pad. However, the adhesive is preferably activated by external friction, for which purpose the adhesive and the substrate are rubbed together. The friction generated should be so great that a 2 to 200 $\mu$m thick film and, more particularly, a 10 to 100 $\mu$m thick film is obtained after the adhesive has been drawn over the substrate once at a speed of 1 to 500 cm/sec. and preferably 2 to 100 cm/sec. under a pressure of 1 kPa to 10 MPa, preferably 5 kPa to 5 MPa and more preferably 10 kPa to 1.0 MPa. These values apply for normal conditions (20° C./50% relative air humidity) and for a paper of the following quality: 5015 Spezial Copier manufactured by Soennecken.

The adhesive according to the invention is solid and partly crystalline at room temperature (20° C.). It is characterized a) by a degree of crystallization, as determined by DSC at a temperature of −40° C. to +120° C., to which corresponds an enthalpy of fusion of 10 to 150 mJ/mg, preferably 15 to 80 mJ/mg and, more preferably, 20 to 70 mJ/mg, b) by at least one crystallization temperature at 20 to 110° C. and, more particularly, at 30 to 80° C. and c) by a crystallization rate of a few seconds to several days, more particularly 30 seconds to 30 minutes. The enthalpy of fusion is determined by DSC. The crystallization temperature is determined by DSC as the temperature at which the melting peak passes through its extremum. The crystallization rate is determined by observing a tacky layer under a polarization microscope.

In view of the significance of these parameters to the bonding process, the adhesive is assumed to work as follows: the crystalline regions are converted into an amorphous form by the mechanical action of rubbing. This amorphous form produces the tackiness. As long as the adhesive does not recrystallize, it remains tacky. After recrystallization, the adhesive loses its tackiness and develops it ultimate strength.

25 to 100% by weight, more particularly 30 to 99% by weight and preferably 60 to 98% by weight of the adhesive according to the invention consists of at least one binder and 0 to 75% by weight, more particularly 0.1 to 70% by weight and preferably 0.5 to 40% by weight of additives. The binder also acts as the shaping substance. The main function of these additives is to influence crystallization, tackiness and rubbing behavior. In addition, however, they may perform the usual functions, i.e. stabilization, preservation, coloring, etc.

In one preferred embodiment, the binder generally consists of A) at least one partly crystalline polyester component and B) at least one amorphous and/or liquid polyester component. Both binder components A) and B) are insoluble in water, i.e. less than 10 g and, more particularly, less than 1 g dissolves in 100 ml of water at 20° C. They have an average molecular weight $MW_w$ of 1,000 to 25,000 and, more particularly, 2,000 to 15,000. Given suitable crystallinity, the A component may make up 100%. The quantity ratio of crystalline component to amorphous component is crucial. In general, the partly crystalline polyester should make up from 5 to 95% by weight, preferably from 15 to 60% by weight and more preferably from 20 to 40% by weight.

Components A and B should have only limited compatibility with one another so that, morphologically, a mixture of crystalline and amorphous regions is discernible (by observation under a polarization microscope, DSC, X-ray examination). Nevertheless, an apparently homogeneous distribution is macroscopically present and should not change with time. There should be no signs of separation, even at elevated storage temperatures. To achieve compatibility, a compatibilizer, for example a special polyester plasticizer or a special block polymer, may even be used. However, compatibility is preferably stabilized by chemically combining components A and B with one another, for example by subsequent chemical attachment of active groups to polyisocyanates.

Polyesters in the context of the present invention are understood to be polymers predominantly containing ester groups in the main chain. However, they are also intended to encompass polymers predominantly containing ester groups in their comb-like side chains, for example polyacrylates in which the alcohol component contains from 1 to 18 carbon atoms and preferably 1 to 8 carbon atoms. The other groups may be amide groups (polyester amides) or urethane groups (polyester urethanes).

Pure polyesters with the ester groups in the main chain are preferably used.

Basically, any monomers which, after polymerization, form ester bonds in the main chain (including polycarbonates) are suitable for production of the PES. In addition to carbon atoms, they may also contain hetero atoms (S, N, halogens, P). Besides acid and alcohol functions, other functional groups may also be present. In particular any monomers of the type already used for PES or the PES component of PUR hotmelt adhesives may be employed. The terminal groups of the polyesters may be modified by after-reaction, for example by esterification and transesterification. The terminal groups are preferably OH, —COOH or urethane groups. The structural units for the polyesters are dicarboxylic acids, hydroxycarboxylic acids and diols.

The dicarboxylic acid structural units may be used in any reactive form, for example as free acid, acid chloride, ester (especially methyl ester), etc. Suitable acids are aliphatic polycarboxylic acids, especially dicarboxylic acids containing 1 to 36 carbon atoms, unsaturated and aromatic dicarboxylic acids and dicarboxylic acids containing the hetero atoms S, N and halogens (bromoterephthalic acid, fluoroterephthalic acid). Specific examples of such acids are oxalic acid, malonic acid, sebacic acid, azelaic acid, decane dicarboxylic acid, dodecane dicarboxylic acid, dimethyl-1,4-cyclohexane dicarboxylic acid ester, p-phenylene diacetic acid, 2,5-dimethyl terephthalic acid, methyl terephthalic acid, 2,6-naphthyl dicarboxylic acid, 4,4'-isopropyl dibenzoic acid, 1,2-ethylenedioxy-4,4'-dibenzoic acid. 4,4'-dibenzoic acid (diphenic acid), sulfonyl-4,4'-dibenzoic acid. Succinic acid, glutaric acid, adipic acid, isophthalic acid, terephthalic acid, phthalic acid and macromonomers (prepolymers) containing more than 36 carbon atoms are particularly suitable.

Hydroxycarboxylic acid structural units may also be used in any reactive form, for example as free acid, acid chloride, ester (especially methyl ester), etc. Aliphatic hydroxycarboxylic acids containing several hydroxy and carboxylic acid groups, but preferably one hydroxy group and one carboxylic acid group, and 2 to 36 carbon atoms are suitable. The same applies to unsaturated and aromatic hydroxycarboxylic acids and to hydroxycarboxylic acids containing hetero atoms, such as S, N and halogens. Specific examples of suitable hydroxycarboxylic acids are 4-hydroxybenzoic acid, pivalolactones, ε-caprolactones, 6-hydroxy-2-naphthoic acid, lactic acid and glycolic acid.

The polyol structural units may also be used in any reactive form, for example as free alcohol, ester (especially acetic acid ester), etc. Aliphatic polyols, especially diols containing 1 to 36 carbon atoms, are suitable. The same applies to unsaturated and aromatic polyols and to polyols containing the hetero atoms S, N and halogens. Specific examples of suitable polyols are propane-1,2-diol, propane-1,3-diol, butane-1,4-diol, 1,4-cyclohexane dimethanol, 2,2-dimethyl propane-1,3-triol, decanediol, 4,4'-dihydroxy-1,1'-biphenyl, di-p-hydroxyphenyl propane, 1,4-hydroquinone, bicyclo-[2.2.2]-octane dimethylene glycol, methyl-p-phenylene glycol

where n=1 to 30 (even in the m-position). Preferred polyols are pentane-1,4-diol, ethylene glycol, hexane-1,6-diol, butane-2,3-diol, neopentyl glycol, 2-methyl butane-1,4-diol and macromonomers (prepolymers) containing more than 36 carbon atoms, for example polyethylene glycol or poly (tetrahydrofuran) diol.

Other suitable monomers and the relationship between monomers and crystallinity are well-known to the expert (see, for example, Encyclopedia of Polymer Science and Technology, keyword "Polyesters", pages 62 to 128).

Polyester amides are copolymers containing amide and ester groups in the main chain. A statistical copolymer is produced by co-condensation of the monomers. The monomers may be diacids, diamines, diols, amino acids, hydroxy acids corresponding to the list for polyesters apart from the terminal groups. They may be used in any reactive form. Block copolymers may be obtained from various polyester blocks by linkage of, for example, carboxylic-acid-terminated polyesters with diisocyanates (or NCO-terminated prepolymers). (Di)carboxylic acids may also be reacted with bisoxazolines or oxazolidin-2-ones. Block copolymers may also be obtained from polyamides and polyesters with the aid of isocyanates or by transesterification or transamidation. The structural units for the polyesters and the polyamides were mentioned above in reference to the polyesters. They are corresponding compounds with amino groups instead of hydroxyl groups. Preferred structural units are again diamines and diacids or amino- and acid-functionalized monomers, such as lactam.

In another preferred embodiment, the binder is a polyurethane which can be produced from the following components:

a) at least one aliphatic or aromatic diisocyanate, more particularly MDI, TDI, HDI, IPDI and, above all, TMXDI, b) at least one crystallizing diol, more particularly from the following group:
  polyethylene glycol with an average molecular weight (number average) in the range from 200 to 40,000, more particularly in the range from 1,500 to 15,000 and preferably in the range from 4,000 to 8,000,
  polytetrahydrofuran with a molecular weight in the range from 200 to 4,000 and more particularly in the range from 1,000 to 3,000,
  a copolymer of ethylene oxide and propylene oxide with a molecular weight in the range from 200 to 40,000 and preferably in the range from 400 to 10,000, the copolymer best being a block copolymer of the PEG/PPG/PEG type with a PEG content of 10 to 80% and, optionally,
  polyester diol, more particularly a polycaprolactone diol with a molecular weight in the range from 200 to 50,000 and more particularly in the range from 200 to 5,000, c) optionally at least one diol capable of forming ions, more particularly carboxylate, sulfate or ammonium ions, d) optionally at least one polyol with a functionality of 3 or more, such as glycerol and TMP, and e) optionally at least one hydrophobic diol, more particularly from the following group:
  polypropylene glycol with a molecular weight in the range from 200 to 4,000 and more particularly in the range from 500 to 2,000 and
  an alkanediol containing 1 to 100 carbon atoms, more particularly 2 to 50 carbon atoms and preferably 5 to 30 carbon atoms, the ratio of the isocyanate groups to the hydroxyl groups being variable from 0.5 to 1.2:1 and more particularly from 0.7 to 1:1.

The polyurethanes may be produced both in a one-stage process and in a two-stage process. In the two-stage process, a prepolymer is initially prepared by partly prereacting the polyols, for example the hydrophilic polyols, with the diisocyanate. The remaining polyol is then added.

However, the polyurethane according to the invention is preferably produced in a one-stage process. In this process, all the starting materials are initially mixed in the presence of an organic solvent at a water content of less than 0.5% by weight. The mixture is heated for about 1 to 30 hours and more particularly for 1 to 5 hours to a temperature of 70 to 200° C., more particularly to a temperature of 80 to 170° C. and preferably to a temperature Examples of 130 to 170° C. The reaction time can be shortened by the presence of catalysts, more particularly tertiary amines, for example triethylamine, dimethyl benzylamine, bis-dimethylaminoethyl ether and bis-methylaminomethyl phenol. Particularly suitable catalysts are 1-methyl imidazole, 2-methyl-1-vinyl imidazole, 1-allyl imidazole, 1-phenyl imidazole, 1,2,4,5-tetramethyl imidazole, 1-(3-aminopropyl)-imidazole, pyrimidazole, 4-dimethylaminopyridine, 4-pyrrolidinopyridine, 4-morpholinopyridine, 4-methyl pyridine. However, the one-stage process is preferably carried out without a catalyst. It is also advisable to leave out the solvent. Suitable solvents are inert organic liquids with a boiling point below 200° C. at normal pressure, more particularly acetone.

The polyester urethanes are prepared in known manner from polyester polyols and polyisocyanates, more particularly from polyester diols and diisocyanates. The polyester polyols were described earlier on. They may be reacted both with aliphatic isocyanates and with aromatic isocyanates. Preferred diisocyanates are NDI, HDI, CHDI, IPDI, TMDI, m-TMXDI, p-TMXDI, $H_{12}$-MDI, PPDI,2,4-TDI, 80:20-TDI, 65:35-TDI, 4,4'-MDI, polymer-MDI and n-TMI. Other suitable isocyanates are DDI 1410, TDI, MDI, 2,4'-MDI; Desmodur R, Desmodur RI, IEM and m-phenylene diisocyanate.

These and other polyisocyanates are well-known to the expert (see Encyclopedia of Polymer Science and Technology, keyword "Polyurethanes", pages 244 to 248). The polyester urethanes are preferably terminated by OH, COOH, ester and urethane groups.

Polyester urethanes (polyether urethanes) modified by terminal groups are produced by initially preparing polyester urethanes (polyether urethanes) containing terminal NCO groups. The free terminal NCO groups are then reacted with preferably mono-reactive compounds known from urethane chemistry. For example terminal alkyl groups containing 4 to 22 carbon atoms may be introduced via fatty alcohols. Reactions with aromatic alcohols and polyesters containing an OH or COOH group are also mentioned.

In one particularly preferred embodiment of the adhesive according to the invention, an NCO-terminated prepolymer based on an aromatic or cycloaliphatic isocyanate and a polyglycol is initially prepared, after which those NCO groups which have not been reacted off in this substoichiometric reaction are saturated with aliphatic alcohols containing 4 to 22 carbon atoms, with aromatic alcohols or with OH- or COOH-terminated polyesters so that reaction products free from reactive groups are formed.

Polyester/polyurethane mixtures may also be used as the binder. The polyurethane may be a polyester urethane or a polyether urethane or a mixture of a polyester urethane and a polyether urethane.

In addition to the binder, the adhesive may contain the following additives:

a) 0 to 50% by weight and more particularly 0 to 20% by weight of at least one crystallinity-modifying additive, more particularly from the following group: salts of aromatic and aliphatic carboxylic acids (for example Ca stearate), wax, polyacrylate, polyethylene, polyvinyl acetate, polyamide, polyurethane and polyvinyl chloride and also polyester or polyurethane where the binder is a polyurethane or a polyester, b) 0 to 20% by weight, more particularly 0 to 10% by weight and preferably 0.1 to 5% by weight of at least one fine-particle water-insoluble pigment or filler, more particularly from the following group: alkali metal stearate, graphite, talcum, $TiO_2$, highly disperse silica (Aerosil), bentonite, wollastonite, chalk, magnesium oxide and glass fibers, c) 0 to 30% by weight and more particularly 0 to 10% by weight of at least one non-volatile plasticizer, above all from the group of phthalates, sebacates, phosphates, for example: diphenyl phthalate, benzylbutylphthalate, trioctyl phosphate and n-ethyl-o,p-toluene sulfonamide, d) 0 to 5% by weight and more particularly 0 to 2% by weight of at least one of the following additives: antioxidants, preservatives and dyes, e) water and f) 0 to 30% by weight and more particularly 0 to 10% by weight of at least one tackifier, above all from the following group: terpene/phenol resin, rosin/glycerol ester, polycyclopentadiene resin, hydrocarbon resin and methyl styrene/styrene copolymer.

The type and quantity of additives do of course vary according to the binder. The above list applies above all to polyesters. For polyurethanes, more particularly polyether urethanes, recommended crystallinity modifiers are PEG, PPG, PTHF and/or a polyester added in quantities of 0 to 50% by weight and more particularly 10 to 40% by weight. Additions of 0 to 50% by weight, more particularly 0 to 30% by weight and above all 0 to 10% by weight of at least one water-miscible hydrophilic plasticizer from the group consisting of glycerol, ethylene glycol and diglyme are recommended as the non-volatile plasticizer.

The water content of the adhesive is between 0 and 15% by weight and, more particularly, is well below 5% by weight, as measured by the Karl Fischer method. The percentages by weight shown are based on the adhesive as a whole.

The plasticizers all have a boiling point above 150° C. at normal pressure. Accordingly, the adhesive is substantially free from readily volatile solvents.

The binder and the additives are mixed in the melt, preferably until no differences in homogeneity are visually discernible.

The adhesive thus obtained may be brought into any required shape, for example flakes, films or sticks. Adhesive sticks with a circular, elliptical or angular cross-section are preferred.

In its ready-to-use form, the adhesive no longer contains any reactive groups. Finally, it contains less than 10% by weight and preferably less than 5% by weight of volatile organic constituents with a boiling temperature below 150° C.

The adhesive according to the invention is suitable above all for bonding substrates. To this end, the adhesive is activated by internal and/or external friction, the substrates are fitted together with the now tacky adhesive in between and, finally, the adhesive is allowed to set by leaving for a few seconds to a few days.

When the adhesive is rubbed onto paper, a 2 to 200 µm and preferably 10 to 100 µm thick film is formed at a speed of 1 to 500 cm/sec. and preferably 2 to 100 cm/sec., under a pressure of 1.0 kPa to 10 MPa, preferably 5.0 kPa to 5.0 MPa and more preferably 10 kPa to 1 MPa and at a temperature of 20° C.

The adhesive according to the invention has the following advantages:

It requires little or no packaging for normal ambient conditions (20° C./50% relative air humidity).

Its composition does not have to be shown on a label.

It is non-inflammable.

It is mechanically activated by rubbing under light pressure.

It is non-stringing.

The bond can be broken by heating.

Paper does not curl after application of the adhesive.

The setting rate of the adhesive is very high: the adhesive feels dry (and non-tacky) only a few seconds after application.

The adhesive is easy to produce by virtue of its rapid recrystallization and its low melt viscosity.

The properties mentioned above apply above all to PES binders. Some other binders produce other positive properties. For example, the polyether urethanes are easy to wash out from fabrics or at least their binding effect can be eliminated with water. Recrystallization can also be delayed so that the bond can be corrected.

The invention is illustrated by the following Examples:

I. Starting Materials

1). Starting Materials for PES

Dynacoll 7360, a partly crystalline copolyester based on adipic acid and hexanediol with a hydroxyl value of 27 to 34 mg KOH/g (DIN 53240), an acid value of <2 mg KOH/g (DIN 53402), a melting point of 60° C. (DSC), a softening point of 65° C. (R+B, ISO 4625), a viscosity of about 2,000 mPa·s at 80° C. (Brookfield LVT 4) and a molecular weight (from the hydroxyl value) of about 3,500.

Dynacoll 7140, an amorphous copolyester based on terephthalic acid, isophthalic acid, ethylene glycol, butane-1,4-diol and hexanediol with a hydroxyl value of 18 to 24 mg KOH/g (DIN 53240), an acid value of <2 mg KOH/g (DIN 53402), a glass transition temperature of about +40° C. (DSC), a softening point of 90° C. (R+B, ISO 4625), a viscosity of 100 mPa·s at 130° C. (Brookfield LVT 4) and a molecular weight (from the hydroxyl value) of about 5,500.

Dynacoll 7110, an amorphous copolyester based largely on terephthalic acid, pentane-1,4-diol and hexanediol with a hydroxyl value of 50 to 60 mg KOH/g (DIN 53240), an acid value of 8 to 12 mg KOH/g (DIN 53402), a glass transition temperature of +10° C. (DSC), a softening point of 60° C. (R+B, ISO 4625), a viscosity of 10 Pa·s at 100° C. (Brookfield LVT 4) and a molecular weight (from the hydroxyl value) of 2,000.

Dynacoll 7220, a liquid copolyester based on terephthalic acid, adipic acid, 2-methylbutane-1,4-diol and butane-1,4-diol with a hydroxyl value of 27 to 34 mg KOH/g (DIN 53240), an acid value of <2 mg KOH/g (DIN 53402), a glass transition temperature of −20° C. (DSC), a viscosity of 5 Pa·s at 100° C. (Brookfield LVT 4) and a molecular weight (from the hydroxyl value) of about 3,500.

Dynacoll 7340, a partly crystalline copolyester with a hydroxyl value of 27 to 34 mg KOH/g (DIN 53240), an acid value of <2 mg KOH/g (DIN 53402), a melting point of 92° C. (DSC), a glass transition temperature of −40° C. (DSC), a softening point of 100° C. (R+B, ISO 4625), a viscosity of 3 Pa·s at 130° C. (Brookfield LVT 4) and a molecular weight (from the hydroxyl value) of about 3,500.

Dynacoll 8350, a carboxyl-containing copolyester with an acid value of 26 to 30 mg KOH/g (DIN 32402), a glass transition temperature of −50° C. (DSC), a viscosity of 140 Pa·s at 20° C. (Brookfield LVT 4) and a molecular weight of about 4,000.

Dynacoll 8250, a carboxyl-containing copolyester with an acid value of 15 to 19 mg KOH/g (DIN 32402), a glass transition temperature of −50° C. (DSC), a viscosity of 140 Pa·s at 20° C. (Brookfield LVT 4) and a molecular weight of 6,000.

Dynacoll is a trademark of Hüls AG.

Capa 240 is a trademark of Interox Chemicals Ltd. for a linear poly-ε-caprolactone with a hydroxyl value of 28 mg KOH/g, an acid value of <0.5 mg KOH/g, a melting range of 55 to 60° C. and a molecular weight of about 4,000.

PES1 is a polyester urethane of Dynacoll 7360 and Desmodur W in a molar ratio of 2:1.

PES2 is a polyester urethane of Dynacoll 7360, Dynacoll 7140 and Desmodur W in a molar ratio of 1:2:2.

PES3 is a polyester urethane of Dynacoll 7360 and TMXDI in a molar ratio of 2:1.

PES4 is a polyester urethane of Dynacoll 7360 and IPDI in a molar ratio of 2:1.

PES5 is a polyester urethane of Dynacoll 7360 and 2,4'-MDI in a molar ratio of 2:1.

PES6 is a polyester urethane modified with terminal octyl dodecanol groups: Dynacoll 7360 and IPDI are reacted in a molar ratio of 2:3.

The product of this reaction is reacted with octyl dodecanol so that the NCO content is below 0.01% and the molar ratio of polyester to diisocyanate to alcohol is 2:3:2.

Foral-85 is a trademark of Hercules for a hydrogenated rosin/glycerol ester with an acid value of 9 mg KOH/g, a softening temperature of 80° C. (R+B) and a viscosity of 100 mPa·s at 160° C. (Brookfield).

Kristalex F85 is a trademark of Hercules for an α-methyl styrene/styrene copolymer with a softening point of about 85° C. (R+B).

Bevitak 95 is a trademark of Bergvik for a tackifier.

Desmodur W is a trademark of Bayer AG for 12-H-MDI.

2. Starting Materials for Polyurethanes a) Diisocyanate TMXDI, IPDI, MDI
triisocyanate of hexamethylene diisocyanate (Tolonate HDT, Rhone-Poulenc)

b) Diols:
Loxanol=1,12-$C_{18}$-diol
DMPA=dimethylol propionic acid
Pluronic 6800=PEG-PPG-PEG block copolymer containing 20% PPG: MW 8,500
PTHF 2000=polytetrahydrofuran, MW 2,000
PEG 6000=polyethylene glycol, MW 6,000

Abitol E is a trademark of Hercules for a technical hydroabietyl alcohol containing 4.75% OH and having a viscosity of 40,000 mPa·s at 40° C.

Terathane 1000 is a trademark of BASF for a polytetramethylene ether glycol with a molecular weight of 1,000.

WS 1 is a reaction product of Terathane 1000 and Desmodur V 44 in an OH:NCO ratio of 1:1.5, excess NCO groups being reacted with $C_{12}/C_{10}$ alcohol in a ratio of 20:80.

WS2 is a reaction product of the following starting materials in the ratio shown:
Terathane 1000:Tolonate HDT:Abitol E:$C_{16}$ alcohol= 31.4:35.6:9.4:23.6.

WS3 is a reaction product of the following starting materials in the ratio shown:
Terathane 1000:Tolonate HDT:Abitol E:$C_{12}$ alcohol= 22.5:31.8:14.7:16.1.

WS4 is a reaction product of the following starting materials in the ratio shown:
Terathane 1000:Tolonate HDT:Abitol E:$C_{14}$ alcohol:$C_{16}$ alcohol=21.5:35.6:14.3:5.1:13.5.

3. Additives

PEG 600=polyethylene glycol, MW 600
PEG 1550=polyethylene glycol, MW 1550
PEG 35000=polyethylene glycol, MW 35,000
Bentonite
Ca stearate II. Production 1. In Examples I, 1a–g and III., the PU was produced as in Example I.2 except that the diols were also freed from water.

2. in Examples I, 2a–k, the PU was produced as follows:
The PEG 6000 (Lipoxol, Hüls) and the dimethylol propionic acid (Angus Chemie) were freed from water for 2 h at 80° C. in an oil pump vacuum. m-TMXDI (Cyanamid) is then added and the mixture is heated to 145° C. The theoretical NCO content of 0% residual NCO is reached after 2 h.

3. The adhesive was produced as follows from the binder and the additives:
The individual components were combined and melted together with stirring. Stirring is continued until a homogeneous mixture is present.
The melt was poured into molds and removed therefrom after 24 h.
The Examples are based on the following compositions (parts by weight):

4. Compositions

[% by weight]

Examples I. 1a–g:

| | |
|---|---|
| a) PU(Pluronic 6800:DMPA:Loxanol:TMXDI = 1:8.4:0.8:9.7) | 75% |
| PEG600 | 20% |
| Ca stearate | 5% |

4. Compositions

|  | [% by weight] |
|---|---|
| b) PU(Pluronic 6800:DMPA:Loxanol:TMXDI = 1:8.4:0.8:9.7) | 75% |
| PEG600 | 20% |
| Bentonite | 5% |
| c) PU(PEG 6000:DMPA:Loxanol:TMXDI:PTHF 2000 = 0.76:8.4:0.8:9.2:0.24) | 85% |
| PEG600 | 15% |
| d) PU(Pluronic 6800:DMPA:Loxanol:TMXDI = 1:8.4:0.8:9.7) | 85% |
| PEG600 | 15% |
| e) PU(PluronicG800:DMPA:Loxanol:TMXDI = 1:16.7:0.8:17.6) | 70% |
| PEG 600 | 30% |
| f) PU(Pluronic 6800:DMPA:Loxanol:TMXDI = 1:16.7:0.8:17.6) | 69% |
| PEG 600 | 30% |
| PEG 35000 | 1% |
| g) PU(Pluronic 6800:DMPA:Loxanol:TMXDI = 1:16.7:0.8:17.6) | 70% |
| PEG 1550 | 30% |

Examples 1. 2a–k

|  |  |
|---|---|
| a) PU(PEG6000:DMPA:TMXDI = 1:8.37:8.9) | 100% |
| b) PU(PEG6000:DMPA:TMXDI = 1:0.86:1.67) | 100% |
| c) PU(PEG6000:DMPA:TMXDI = 1:15:15.2) | 100% |
| d) PU(PEG6000:DMPA:TMXDI = 1:15:15.2) | 50% |
| PEG200 | 50% |
| e) PU(PEG 6000:DMPA:TMXDI = 1:8.37:8.9) | 100% |
| f) PU(PEG 6000:DMPA:TMXDI = 1:8.37:8.9) | 100% |
| Neutralized with NaOH |  |
| g) PU(PEG 6000:DMPA:TMXDI = 1:8.37:8.9) | 90% |
| Glycol | 10% |
| h) PU(PEG6000:DMPA:TMXDI = 1:8.37:8.9) | 70% |
| Glycol | 30% |
| i) PU(PEG 6000:DMPA:TMXDI = 1:8.37:8.9) | 70% |
| Diglyme | 30% |
| j) PU(PEG 6000:DMPA:TMXDI = 1:8.37:8.9) | 50% |
| Glycerol | 50% |
| k) PU(PEG 6000:DMPA:TMXDI = 1:8.37:8.9) | 50% |
| PEG 200 | 50% |

Examples II. 1a–v a Dynacoll 7360:Dynacoll 7140=30:70
b Dynacoll 7360:Dynacoll 7140:Ca stearate=30:70:5
c Dynacoll 7360:Dynacoll 7110=30:70
d Dynacoll 7360:Dynacoll 7110=20:80
e Dynacoll 7340:Dynacoll 7140=30:70
f Dynacoll 8350:Dynacoll 7220=30:70
g Dynacoll 8350:Dynacoll 8250=50:50
h Dynacoll 7360:Dynacoll 7140:butylbenzylphthalate= 28.5:66.5:5
i Dynacoll 7360:Dynacoll 7140:butylbenzylphthalate= 27:63:10
j Dynacoll 7360:Dynacoll 7140:butylbenzylphthalate= 24:56:20
k Dynacoll 7360:Dynacoll 7110:Foral 85=30:60:10
l Dynacoll 7360:Dynacoll 7110:Bevitack 95 =30:60:10
m Dynacoll 7360:Dynacoll 7110:Kristalex r F85= 30:60:10
n Dynacoll 7110:PES1=70:30
o Dynacoll 7360:PES2=10:90
p Capa 240:Dynacoll 7110=30:70
q Dynacoll 7360:Dynacoll 7110:bentonite=30:70:10
r Dynacoll 7360:Dynacoll 7110:butylbenzylphthalate= 20:80:2.5
s Dynacoll 7110:PES3=70:30
t Dynacoll 7360:Dynacoll 7110:polyethyl acrylate= 20:80:5
u Dynacoll 7110:PES4=70:30
v Dynacoll 7110:PES5=70:30
w Dynacoll 7110:PES6=60:40

Mixtures of polyester urethanes and polyether urethanes x PES 4 33.3%
   (Pluronic 6800:DMPA:Loxanol:TMXDI= 1:8.4:0.8:9.7) 66.7%
y PES4 7.5%
   (Pluronic 6800:DMPA:Loxanol:TMXDI= 1:8.4:0.8:9.7) 63.7%
   Dynacoll 7110 17.5%
   PEG 600 11.3%

Examples III, 1a)–m)

a) Terathane 1000:Desmodur 44:Abitol E:Dynacoll 7360:$C_{14}$ alcohol
   51.3:20.1:5.7:19.6:3.3
b) Terathane 1000:Desmodur 44:Abitol E:Dynacoll 7360:$C_{14}$ alcohol
   56.0:22.0:6.3:10.9:4.9
c) Terathane 1000:Tolonate HDT:Abitol E:$C_{14}$ alcohol
   32.7:37.1:17.6:15.3
d) Terathane 1000:Tolonate HDT:$C_{14}$ alcohol
   34.7:39.4:25.9
e) Terathane 1000:Tolonate HDT:Abitol E:$C_{16}$ alcohol
   31.4:35.6:9.9:23.6
f) Terathane 1000:Tolonate HDT:Abitol E:$C_{16}$ alcohol: $C_8$ alcohol
   32.6:36.9:14.8:10.2:5.5
g) WS1:Dynacoll 7360:Dynacoll 7130
   62.5:33.3:4.2 h) WS2:Dynacoll 7360:Dynacoll 7140:butylbenzylphthalate:aluminium silicate:Kristallex F 85
60:26.7:3.3:5.3:1.3:18.3 i) WS1:Dynacoll 7360:Dynacoll 7100:Abitol E:butylbenzylphthalate:aluminium silicate:Kristallex F 85
57.3:21.3:1.0:1.3:8.5:2.6:5.3 k) WS3:Dynacoll 7360:Dynacoll 7100:butylbenzylphthalate:aluminium silicate
57.7:30.8:3.9:6.2:1.5 l) WS4:Dynacoll 7140
88.3:11.8 m) WS4:Dynacoll 7140
65.2:34.8

III Tests

1. Bonds

Bonding was generally carried out as follows: pressure about 500 kPa, speed: about 100 cm/sec., room temperature, film thickness: about 50 μm.

2. Tests Were Carried Out to Determine:

a) Adhesive strength after 10 secs.: the ends of a strip of cardboard were joined to form a ring and the adhesion time was subsequently evaluated (result expressed as time). A strip of cardboard measuring 29.1 cm×5 cm for a thickness of 250 g/m² is used. Measuring from the edge, a 2 cm wide margin of one narrow side of the strip is coated with adhesive on one side. The ends of the strip are then joined together to form a ring and pressed together for 10 seconds. The time elapsing before the ring breaks open again is measured.

b) Adhesive strength after 1 day: Soennecken copier paper (5015 Spezial Copier) is bonded with the adhesive. Test for tearing of paper after 1 day (percentage of paper torn (P)/separation (T)).

c) Tensile shear strength of wood/wood bonds: two beech-wood test specimens are coated with adhesive at their ends and fitted together in such a way that the two adhesive-coated ends overlap by 2 cm (area bonded 2 cm×2.5 cm). The test specimens are fixed with two clamps and measured after 24 hours. The result is expressed in N/mm².

d) Rubbing: rubbing onto Soennecken copier paper (5015 Spezial Copier). The result is expressed as school marks.

e) Crystallinity : measurement of the DSC curves (S: enthalpy of fusion, peak melting temperature. The peak may be structured or consists of several peaks. The temperature for the largest peak is shown. 1st heating; R: recrystallization, peak recrystallization temperature—2nd heating; −60° C. to +100° C., 10° C./min., cooling in a stream of nitrogen).

f) Setting behavior—evaluation of crystallinity under a polarization microscope (tendency to crystallize characterized as rapid, slow or "none").

g) Melt viscosity (Epprecht): 125° C. [Pas]

2. Test results
Table 1: Example I.

| | a | b[%] | c[N/mm²] | Test d | e[mJ/mg ° C.] | f | g[Pas] |
|---|---|---|---|---|---|---|---|
| I. 1a | >24 h | 40% | 0.1 | 3 | S: 52/40 R: −28/−31 | — | — |
| 1b | >24 h | 70% | 0.2 | 3 | S: 53/40 R: −42/−30 | — | — |
| 1c | >24 h | 50% | 0.3 | 4 | S: 55/47 R: −47/−2 | Slow | — |
| 1d | >24 h | 95% | 0.5 | 4 | S: 48/42 R: −30/−23 | Slow | — |
| 1e | >24 h | 10% | 0.4 | 4 | S: 44/40 R: −38/−16 | Slow | — |
| 1f | >24 h | 50% | 0.2 | 4 | S: 40/44 R: −34/−15 | Slow | — |
| 1g | >24 h | 95% | 1.4 | 5 | S: 69/51 R: −39/−20 | Slow-rapid | — |
| I. 2a | | | 2.2 | | | | 50 |
| 2b | | | 2.0 | | | | 40 |
| 2c | | | 1.8 | | | | >256 |
| 2d | | | 0.6 | | | | — |
| 2e | | | 4 | | | | 70 |
| 2f | | | 0.2 | | | | 100 |
| 2g | | | 0.4 | | | | — |
| 2h | | | 3.7 | | | | — |
| 2i | | | 0.1 | | | | — |
| 2j | | | 0.3 | | | | — |
| 2k | | | 0.3 | | | | — |

Table 2. Examples II. 1a)–l)

| Example No. | d) Rubbing | a) Early tack | Test method c) Tensile-shear strength | b) Paper torn | e) Melting peak | e) Recryst. peak |
|---|---|---|---|---|---|---|
| II. 1a) | 3–4 | >24 h | 0 | 0 | 31 mJ/66° | −11 mJ/−3°, 46° |
| b) | 3–4 | >24 h | 0 | 0 | | |
| c) | 2 | >24 h | 0.2 | 50 | 30 mJ/58° | |
| d) | 2–3 | >24 h | 0.5 | 90 | | |
| e) | 3–4 | 1.5 h | 0.77 | 0 | | |
| f) | 4 | >24 h | 0.34 | 0 | | |
| g) | 1 | 20 mins. | 0 | 0 | | |
| h) | 3–4 | >24 h | 0 | 0 | 27 mJ/62° | −17 mJ/0°, 34° |
| i) | 3 | >24 h | 0.33 | 90 | 29 mJ/53° | −18 mJ/26° |
| j) | 4 | >10, <24 h | 0.13 | 100 | 26 mJ/56° | −21 mJ/26° |
| k) | 2–3 | >24 h | 0.02 | 0 | | |
| l) | 2–3 | >24 h | 0.35 | 0 | 29 mJ/57° | −10 mJ/43° |

-continued

Table 2 (continued). Test results of Examples II. 1m)–y)

| Example No. | d) Rubbing | a) Early tack | Test method c) Tensile-shear strength | b) Paper torn | e) Melting peak | e) Recryst. peak |
|---|---|---|---|---|---|---|
| m) | 2–3 | >24 h | 0.23 | 0 | 33 mJ/59° | −7 mJ/45° |
| n) | 2 | >24 h | 1.30 | 90 | 29 mJ/59° | −8 mJ/44° |
| o) | 6 | >24 h | 1.76 | 0 | | |
| p) | 3 | >24 h | 0.24 | 95 | 31 mJ/59° | |
| q) | 3 | >24 h | 0.23 | 90 | 28 mJ/53° | −16 mJ/42° |
| r) | 3 | >24 h | 0.56 | 95 | | |
| s) | 2–3 | >24 h | 0.12 | 95 | | |
| t) | 2–3 | >24 h | 0.11 | 70 | | |
| u) | 2–3 | >24 h | 1.30 | 95 | 25 mJ/52° | −4 mJ/380° |
| v) | 2 | >24 h | 0.85 | 95 | 27 mJ/51° | −12 mJ/32° |
| w) | 2 | >24 h | 0.26 | 95 | 31 mJ/48° | −16 mJ/29° |
| x) | 3 | >24 h | 1.42 | 90 | 53 mJ/42° | −19 mJ/−5° |
| y) | 3 | >24 h | 0.67 | 95 | 38 mJ/40° | −30 mJ/−2.6° |

Table 3: Examples III. 1a)–m)

| Example No. | d) Rubbing | a) Early tack | Test method c) Tensile-shear strength [N/mm²] | b) Paper torn [%] | e) Melting peak [mJ/mg/° C.] | e) Recryst. peak [mJ/mg/° C.] |
|---|---|---|---|---|---|---|
| III. 1a) | 5 | >1 h | 0.35 | 30 | 9/45 | |
| b) | 4 | 3 h | 0.81 | 60 | 11/42 | −13/44 |
| c | 5 | 4 h | 0.51 | 40 | 7/45 | |
| d | 4 | 5 h | 0.35 | 30 | 19/40 | |
| e | 2 | >24 h | 0.45 | 30 | 32/40 | −17/28 |
| f | 1 | >24 h | 1.13 | 100 | 41/56 | |
| g | 2 | >24 h | 1.46 | 100 | 51/49 | −20/33 |
| h | 3 | >24 h | 0.28 | 30 | 31/50 | |
| i | 2 | >24 h | 1.27 | 80 | 37/54 | |
| j | 5 | >24 h | 0.52 | 30 | 22/47 | −10/30 |
| k | 4 | 2 h | 0.96 | 80 | 34/51 | |
| l | 4 | >24 h | 1.71 | 100 | 39/59 | |
| m | 2 | >24 h | 0.89 | 30 | 28/49 | |

What is claimed:

1. A process for bonding substrates at ambiant temperature with a non-reactive, substantially water-free, partly crystalline adhesive, solid at room temperature, which comprises:
   rubbing the solid adhesive against at least one of the substrates to be bonded to form a tacky film of adhesive on the substrate wherein at least a portion of the crystalline adhesive in the film is converted to an amorpheous form;
   joining the substrates with the tacky film of adhesive, located in between said substrates; and
   allowing said tacky adhesive to crystallize whereby a bond is formed between said substrates.

2. The process as claimed in claim 1, wherein said film is about 2 to about 200 μm thick and wherein said film is formed by rubbing the solid adhesive against the at least one substrate at a speed of about 1 to about 500 cm/sec, under a pressure of about 1 kPa to about 10 MPa at a temperature of about 20° C.

3. The process as claimed in claim 2, wherein said film is about 10 μm to about 100 μm thick.

4. The process as claimed in claim 2, wherein said speed is about 2 to about 100 cm/sec.

5. The process as claimed in claim 2, wherein said pressure is about 5 kPa to about 5 MPa.

6. The process as claimed in claim 2, wherein said pressure is about 10 kPa to about 1 MPa.

7. The process for bonding substrates according to claim 1, wherein the at least one substrate is selected from the group consisting of paper, paperboard, wood and cloth.

8. The process for breaking the bond formed by the process as claimed in claim 1, which comprises exposing said bond to heat or water.

9. A non-reactive, substantially water-free, partly crystalline adhesive solid at room temperature, wherein said adhesive comprises:
   a degree of crystallization, as determined by differential scanning calorimetry in the range from about −40° C. to +120° C., having an enthalpy of fusion of about 10 to about 150 mJ/mg;
   at least one crystallization temperature, as determined by differential scanning calorimetry, at about 20 to about 110° C.; and
   a crystallization rate of a few seconds to a few days, as determined by observation under a polarizing microscope.

10. The non-reactive, substantially water-free, partly crystalline adhesive, solid at room temperatures of claim 9, wherein said degree of crystallization is about 15 to about 80 mJ/mg.

11. The non-reactive, substantially water-free, partly crystalline adhesive, solid at room temperature, of claim 9, wherein said degree of crystallization is about 20 to about 70 mJ/mg.

12. The non-reactive, substantially water-free, partly crystalline adhesive solid, at room temperature, of claim 9, wherein said crystallization temperature is about 30 to about 80° C.

13. The adhesive as claimed in claim 9, wherein said adhesive comprises:

about 25 to 100% by weight of a binder comprising
at least one partly crystalline polyester and at least one amorphous or liquid polymer selected from the group consisting of polyesters, polyester amides, polyester urethanes and mixtures thereof with a molecular weight
$MW_w$ of about 1,000 to about 20,000; and
0 to about 75% by weight of additives.

14. The adhesive as claimed in claim 13, wherein said additive comprises: at least one member selected from the group consisting of
   a) up to about 50% by weight of at least one crystallinity-modifying additive,
   b) up to about 20% by weight of at least one fine-particle size water-insoluble pigment or filler,
   c) up to about 20% by weight of at least one non-volatile plasticizer,
   d) up to about 5% by weight of at least one of the following additives: antioxidants, preservatives, dyes and perfumes,
   e) up to about 15% by weight of water; and
   f) up to about 30% by weight of at least one tackifier.

15. The additive as claimed in claim 14, wherein said at least one fine-particle size water-insoluble pigment or filler is selected from the group consisting of alkali metal stearates, graphite, talcum, $TiO_2$, bentonite, wollastonite, chalk, pyrogenic silica, magnesium oxide, glass fibers and mixtures thereof.

16. An additive as claimed in claim 14, wherein said at least one non-volatile plasticizer is present up to about 10% by weight.

17. The additive as claimed in claim 14, wherein said water comprises up to about 5% by weight.

18. The adhesive as claimed in claim 9, wherein said adhesive comprises about 25 to 100% by weight of binder and 0 to about 75% by weight of additives, wherein said binder is a polyurethane comprising the reaction product of:
   at least one aliphatic or aromatic diisocyanate,
   at least one crystallizing polyester or polyether diol,
   optionally at least one diol capable of forming ions,
   optionally at least one polyol with a functionality of 3 or higher; and
   optionally at least one hydrophobic diol, wherein the ratio of the isocyanate groups to the hydroxyl groups is from about 0.5:1 to about 1.2:1.

19. The adhesive as claimed in claim 18, wherein said at least one aliphatic or aromatic diisocyanate is selected from the group consisting of diphenylmethane diisocyanate, toluene diisocyanate, hexamethylene diisocyanate, isophorone diisocyanate, tetramethyl xylene diisocyanate and mixtures thereof.

20. The adhesive as claimed in claim 18, wherein said at least one crystallizing polyester or polyether diol is selected from the group consisting of polyethylene glycol with a number average molecular weight of about 200 to about 40,000, polytetrahydrofuran with a molecular weight of about 200 to about 4,000, copolymer of ethylene oxide and propylene oxide with a molecular weight of about 200 to about 40,000, polyester diol and mixtures thereof.

21. The adhesive as claimed in claim 18, wherein said copolymer of ethylene oxide and propylene oxide is a block copolymer with the structure polyethyleneglycol/polypropyleneglycol/polyethyleneglycol, wherein the polyethyleneglycol content is about 10 to about 80% by weight.

22. The adhesive as claimed in claim 18, wherein said polyester diol comprises polycaprolactone with a molecular weight of about 200 to about 50,000.

23. The adhesive as claimed in claim 18, wherein said at least one diol capable of forming ions is capable of forming carboxylate ions.

24. The adhesive as claimed in claim 18, wherein said at least one polyol with a functionality of 3 or higher is selected from the group consisting of glycerol, trimethylolpropane and mixtures thereof.

25. The adhesive as claimed in claim 18, wherein said at least one hydrophobic diol is selected from the group consisting of polypropylene glycol with a molecular weight of about 200 to about 4,000, alkanediol containing about 1 to about 100 carbon atoms and mixtures thereof.

26. The adhesive as claimed in claim 23, wherein said alkanediol contains about 2 to about 50 carbon atoms.

27. The adhesive as claimed in claim 23, wherein said alkanediol contains about 5 to about 30 carbon atoms.

28. The adhesive as claimed in claim 18, wherein said ratio of the isocyanate groups to the hydroxyl groups is from about 0.7:1 to about 1:1.

29. The adhesive as claimed in claim 9, wherein said adhesive comprises about 25 to 100% by weight of binder and 0 to about 75% by weight of additives, wherein said additives comprise: at least one member selected from the group consisting of
   up to about 50% by weight of at least one crystallinity-modifying additive,
   up to about 20% by weight of at least one fine-particle water-insoluble pigment or filler,
   up to about 50% by weight of at least one non-volatile plasticizer,
   up to about 5% by weight of additives selected from the group consisting of antioxidants, preservatives, dyes, perfumes and mixtures thereof; and
   up to about 15% by weight of water.

30. The adhesive as claimed in claim 29, wherein said at least one crystallinity-modifying additive is selected from the group consisting of polyethylene glycol, polypropyleneglycol, polytetrahydrofuran, polyesters and mixtures thereof.

31. The adhesive as claimed in claim 29, wherein said at least one fine-particle size, water-insoluble pigment or filler is selected from the group consisting of alkali metal stearates, graphite, talcum, titanium dioxide, bentonite, wollastonite, chalk, pyrogenic silica and mixtures thereof.

32. The adhesive as claimed in claim 29, wherein said non-volatile plasticizer is present at up to about 30% by weight, of the adhesive.

33. The adhesive as claimed in claim 32, wherein said plasticizer is present at up to about 10% by weight.

34. The adhesive as claimed in claim 29, wherein said water-miscible hydrophilic plasticizer is selected from the group consisting of glycerol, ethylene glycol, diglyme and mixtures thereof.

35. The adhesive as claimed in claim 29, wherein said water is present at 0 to about 5% by weight.

36. The adhesive as claimed in claim 9, wherein said adhesive contains less than about 10% by weight of volatile solvents.

37. The adhesive as claimed in claim 9, wherein said adhesive contains less than about 5% by weight of volatile solvents.

38. The adhesive as claimed in claim 21, wherein said adhesive has the geometric form of a stick.

39. The adhesive as claimed in claim 38, wherein said stick has a circular, elliptical or angular cross-section.

40. A process for producing the adhesive claimed in claim 9, wherein said adhesive comprises binder and additives, comprising the steps of:
   producing the binder without a solvent, optionally in the presence of a catalyst, mixing the binder and at least one additive so that the binder is visibly uniformly mixed with the additives; and shaping the adhesive.

41. In a process for bonding substrates selected from the group consisting of paper, paperboard, wood and cloth to form a bond between said substrates, wherein the improvement comprises bonding with the adhesive of claim 9.

42. A process for breaking the bond formed in claim 41, comprising exposing the bond to heat or water.

* * * * *

UNITED STATES PATENT AND TRADEMARK OFFICE
CERTIFICATE OF CORRECTION

PATENT NO. : 6,093,270
DATED : July 25, 2000
INVENTOR(S) : Ferencz et al.

It is certified that error appears in the above-identified patent and that said Letters Patent is hereby corrected as shown below:

<u>Title page,</u>
Item [30], Assignee, delete "Kommanditgesellscahft", and insert therefor
-- Kommanditgesellschaft --.

<u>Column 15,</u>
Line 56, after "10 MPa", insert -- , --.

<u>Column 16,</u>
Line 55, after "temperatures", insert -- , --.
Line 62, delete "adhesive solid," and insert therefor -- adhesive, solid --.

<u>Column 18,</u>
Line 49, delete "water-miscible hydrophilic".
Line 59, delete "claim 21", and insert therefor -- claim 9 --.

Signed and Sealed this

Twenty-first Day of October, 2003

JAMES E. ROGAN
*Director of the United States Patent and Trademark Office*